United States Patent [19]
Bächli

[11] Patent Number: 5,009,218
[45] Date of Patent: Apr. 23, 1991

[54] HEAT-INSULATING BUILDING AND/OR LIGHT ELEMENT

[76] Inventor: Emil Bächli, Marktgasse 7, CH-5304 Endigen, Switzerland

[21] Appl. No.: 545,038

[22] Filed: Jun. 28, 1990

Related U.S. Application Data

[62] Division of Ser. No. 88,850, Jul. 22, 1987.

[30] Foreign Application Priority Data

| Nov. 29, 1985 | [CH] | Switzerland | 5091/85 |
| Apr. 16, 1986 | [CH] | Switzerland | 1558/86 |
| Sep. 18, 1986 | [CH] | Switzerland | 3737/86 |

[51] Int. Cl.⁵ ............................................. F24J 2/00
[52] U.S. Cl. ..................................... 126/452; 126/441; 126/450; 428/34; 52/790
[58] Field of Search ............... 126/441, 443, 417, 419, 126/450, 452, 444, 445; 52/171, 304, 790; 428/120, 137, 138, 34

[56] References Cited

U.S. PATENT DOCUMENTS

| 1,370,974 | 3/1921 | Kirlin | 428/34 |
| 2,756,467 | 7/1956 | Etling | 428/34 |
| 3,045,297 | 7/1962 | Ljungdahl | 428/34 |
| 3,441,924 | 4/1969 | Peek et al. | 52/790 |
| 3,531,346 | 9/1970 | Jameson | 428/34 |
| 3,758,996 | 9/1973 | Bowser | 428/34 |
| 4,051,832 | 10/1977 | Stelzer | 126/450 |
| 4,204,015 | 5/1980 | Wardlaw et al. | 428/34 |
| 4,364,208 | 12/1982 | Wilson | 52/304 |
| 4,683,154 | 7/1987 | Benson et al. | 428/34 |
| 4,786,344 | 11/1988 | Beuther | 428/34 |

FOREIGN PATENT DOCUMENTS 0047725 3/1982 European Pat. Off. .

Primary Examiner—James C. Yeung
Attorney, Agent, or Firm—Edmund M. Jaskiewicz

[57] ABSTRACT

A building and/or light element includes at least two parallel wall elements (1) between which support elements (2) for the formation of an evacuated interspace (3) are placed and are connected by a flexible seal on the edge. The distance between the wall elements (1) is less than 0.5 mm and the support elements (2) are formed as disks lying flat between wall elements (1). The production and application of support elements (2) occurs with a punching device placed over the gridlike predetermined distribution surface of wall elements (2).

9 Claims, 10 Drawing Sheets

HEAT-INSULATING BUILDING AND/OR LIGHT ELEMENT

This is a division of application Ser. No. 088,850 filed July 22, 1987, now pending.

The invention relates to a heat-insulating building and/or light element consisting of at least two wall elements having support elements therebetween running at least approximately parallel, and forming an evacuable space by means of a tight connection in the edge area.

For decades in buildings after the storm window the double and triple glazed window has proved reliable, which in the course of time was able to be improved by other measures, such as vapor deposition with an infrared reflecting layer and filling with inert gases with respect to the insulating action to an overall coefficient of heat transfer of 1.3 W/m² K. In comparison with well insulated building outside walls this value is still unsatisfactory.

Even lower overall coefficients of heat transfer (1.0 W/m² K) are attained with insulated glass windows, which have coated transparent films reflecting infrared rays stretched between the panes. The films cause convection, i.e., heat transfer by the moving air, to be greatly impeded. To avoid breaking of the glass, the high pressure forming between the panes during heating must be able to escape from the sealed hollow space of windows up to 100 mm thick. An additionally provided filter causes the new incoming air to be dehumified to preclude fogging of the panes in the hollow space of the window. This design allows a favorable overall coefficient of heat transfer, but as a result of the many reflecting layers impairs the light transmission of the window. In addition, it is bulky and expensive.

Even far better overall coefficients of heat transfer can be attained by vacuum-insulated light elements, since with an increasing vacuum in a hollow space the air convection and subsequent heat conduction are greatly reduced. Besides, glass is one of the most suitable materials which can maintain a vacuum for decades.

In addition, vacuum-insulated light elements achieve a positive heat balance in winter, since the outgoing heat energy loss in a window is smaller than the energy coming in by the light.

The advantage of an evacuated light element consists in the fact that sound cannot be propagated in a vacuum.

Also it is advantageous if no condensate forms in an evacuated hollow space.

In addition, an infrared reflecting layer, for example a silver vapor deposition, provides unmatched good protection from oxidation in a vacuum, and tarnishing is largely prevented.

Thus, it is an uncontested fact that a vacuum-insulated building and/or light element would offer great advantages in use.

However, the present knowledge has not been economically successful.

Thus, in German laid-open specification 25 20 062 a building element with a high insulating quality was made known, in which at least one of the two boundary surfaces, placed at a distance, is transparent or translucent and the boundary surfaces are braced opposite one another by support elements.

In the context of the reference disclosed here a building element is proposed, whose boundary surfaces are spaced a distance of several millimeters because of the cylindrical support elements to be mounted or the spherical support elements to be glued on. The statement that a smaller distance between the boundary surfaces produces a better insulating action is unfounded on the basis of data obtained and rests on assumptions which lack economic considerations and knowledge as well as practical embodiment features.

With such a solution the obvious special configuration of the bond on the edges of the building element made with a small distance between the boundary surfaces is not solved. Nor is a solution known which results in avoiding the visibility of the individual bracing elements, if, as mentioned, light tulle curtains or rain drops act considerably stronger and more irregularly.

European patent specification 0 047 725 discloses a heat-insulating window glass pane with a hollow space, which is exhausted to a gas pressure under 0.1 mbar and has more than ten thousand bridging webs per square meter between the glass panes placed at a distance of about 0.3 mm. The strikingly numerous bridging webs occurring in a narrow arrangement and rigidly connected to the window glass aim at a high stability of these window glass panes with the drawback of great heat conduction by these bridging webs. Obviously by this design the decisive benefit of a vacuum is done away with without it being recognized. This embodiment can indeed meet the demands on a window glass pane in regard to toughness and fatigue strength but its insulating quality is insufficient and the operability of the bond connected with this is unsolved. Because of its design the latter is incapable of absorbing the reciprocal shifts of the glass panes occurring between the temperature difference on both sides of the window glass pane.

According to the final report of a Swiss research project No. 1093.1, tests were conducted in the years 1983 to 1985 on the development of an "Evacuated double window with an extremely high heat insulation." The experiments performed according to DOS 25 20 062 and American patent specification 3,916,871 provided no informative and satisfactory knowledge either about the design or the economical production of an evacuated double window.

Even if the sealing of the interspace had been able to be solved, a window or a glass door with bracing elements impairing the free transparency is undesirable and consequently resulted in the early end of the research project.

In heat insulation of buildings, windows of previous design are the Achilles' heel which must be eliminated. By the vacuum technique it ought to be possible to produce windows with positive energy balance, i.e., with overall coefficients of heat transfer below 0.5 W/m² K. Then in the winter the incoming light energy would be greater than the outgoing heat loss, and a vacuum window even on the north side of a house could represent a sort of heat wall during the day, even though the sun does not shine on it.

With the simultaneous use of vacuum-insulated light elements as window and facade elements, in many case the conventional building heating could be dispensed with, since a transparent vacuum building surface can transfer enough light energy in the form of heat into the building interior, in other words, it represents a kind of heat trap.

In this case the building walls serve as heat accumulators during the night until the light heating again becomes active in the morning.

In the summer, a cooler building results by vacuum-insulated windows and facade elements equipped with shading means, also with outstanding soundproofing values, since sound cannot be propagated in a vacuum.

But despite great efforts it has not been possible to find a satisfactory solution to the present time.

The main obstacle to introduction on the market are the support elements such as spheres or vertical bolts, according to the prior art, arranged gridlike, greatly interfering with the window transparency and borrowed from construction engineering.

In addition, there is a constant danger of accident because of breaking of the glass by implosion of the evacuated window.

Moreover, so far it has not been possible to position these known spheres or bolts accurately in an economical way in great number in a gridlike manner on a glass surface.

Another obstacle to an achievement has been the high vacuum used, which is necessary according to the prior art to be able to achieve an adequate insulating action but which because of the constant steaming of the glass surfaces cannot be maintained for longer periods.

The building element according to German laid-open specification 25 20 062 has the drawbacks of optically interfering bracing elements.

The publication of a research work of SERI, Solar Energy Research Institute, Golden, Colo., USA in the journal "In Review" of January 1985 reported that even recently no advance could be made.

This publication shows two glass sheets 3 mm thick, between which spherical braces are placed gridlike and have a diameter of 4 mm which interferes with the transparency. The necessary high vacuum of $1.3 \times 10^{-3}$ Pa $= 1.3 \times 10^{-5}$ mbar involves great difficulties for its maintenance over decades. Also with the glass distance provided there is the danger of an implosion.

The object of the invention therefore is to provide a heat-insulating building and/or light element of said type, which by a lasting vacuum to the largest extent possible prevents heat losses and whose high insulation power can be produced within the context of industrial possibilities under economical conditions.

This object according to the invention is attained by an interspace evacuated in a fine vacuum range between 1 and $10^{-3}$ mbar, whose distance between the wall elements is designed smaller than the free path length of the air molecules necessary for cancellation of the heat conduction and with a seal absorbing the mutual shifting of the wall elements in the edge area.

This definition ensures the possibility of a high insulating quality of a building and/or light element in the fine vacuum region and a lasting maintenance of the vacuum in an interspace formed by the wall elements tightly connected to one another in the edge area. The considerably more expensive production in the high vacuum region can be avoided without the insulating quality being reduced and the possibility of the free transparency being impaired, quite the reverse.

The steaming of the walls of the evacuated interspace occurring in the high vacuum region is largely eliminated in the fine vacuum region and thus the possibility of maintaining the vacuum is considerably increased.

The present concept of the invention is based, i.a., on the physical factor according to which heat conductivity in gases is practically cancelled if the free path length of the present gas molecules is greater than the distance between cold and hot walls of an evacuated space.

The free path length of the gas molecules is proportional to the low pressure produced by the vacuum. The consequence from this law is that the smaller the distance between the walls the correspondingly less space there is to be evacuated to reduce or eliminate the heat conduction in the gas. Thus, for example, the average free path length of the air molecules in a vacuum of $10^{-1}$ mbar is about 0.6 mm or at 1 mbar about 0.06 mm. In this case, it is to be considered that the air molecules in a vacuum space move not only perpendicularly from wall to wall but also in all directions of the space.

The practical use of these rules leads to as small as possible a distance of the wall elements, so that a technical achievement is still possible. Depending on the surface condition the distance of the wall elements or glass panes is between 0.05 and 0.5 mm.

Of course, an interspace of the present concept of the invention exhibiting a distance up to 1 mm is included as a poorer embodiment.

From this knowledge an unimagined advantage develops, by the support elements between glass panes being able to be dimensioned so small that at a distance of less than one meter they cannot be noticed or only very barely by the naked eye.

It proves to be particularly advantageous if the support elements are designed to rest on the wall elements, and their production and application to a wall element can be performed in a simple way.

The support elements are suitably designed as flat disks, and a small distance between the wall elements of the interspace can be made of flat sheet or strip material or cylindrical or prismatic material.

Advantageously the support elements are made of a transparent material to promote unhindered transparency.

Preferably this material is made softer than the wall elements to be able in this way to avoid damage to the surface of the wall elements which shift because of the heat differences. Plastic is suitable here, for example, polyester or Teflon as particularly favorable material with good sliding properties.

The distance between the braces is determined mainly by the individual wall elements and by their mechanical properties and is to be used accordingly. While in the case of the window glass panes according to European patent specification 0 047 725 distances of about 1 cm and less are provided between the support elements, here in the interest of a slight heat transfer the support elements cover a maximum of 1 per thousand of the total surface of the evacuated building and/or light element. Tests have shown that a considerably lower value is possible, for example 0.3 per thousand.

To prevent infrared radiation it is advantageous if within the interspace at least a layer of gold, silver or other suitable material reflecting the infrared rays is provided.

Because of the changing temperature differences on both sides of the building and/or light element and the mutual shifts of the wall elements occurring as a result, it is advantageous if the support elements are solidly connected to a wall element, e.g, by gluing.

Of special importance in the embodiment of a building and/or light element designed from the economical viewpoint is the related technical operability of the partial tasks of the complex of problems that arises. The demand for a technically more moderate vacuum in an interspace exhibiting a minimal distance of the wall parts and the reciprocal shifting of wall parts resulting therefrom in the direction in which they extend require a combination of solution features which quite obviously were also not known in the development tests.

In addition, the insulating action can be improved by another or several wall elements lined up one after the other, and advantageously the order of arrangement of the support elements of a wall element in relation to the next is offset to impede heat conduction further. A building and/or light element formed from three wall parts make possible in a prototype made according to the teaching of this invention an overall coefficient of heat transfer of 0.31 W/m$^2$ K never yet achieved.

Building elements without the requirement of transparency can be produced in a relatively thin embodiment in the case of multilayer type of construction.

For a lasting absorption of residual gases or vapors, which occurs only slightly in the proposed vacuum area, getter means can be connected to the vacuum space. These getter means increase the reliability of the vacuum and can contribute to the operational usefulness of the building and/or light element. Getter means, which are to be heated periodically, are exposed to solar radiation on the edge of the transparent glass panes.

The tight bond in the end area of the building and/or light element absorbing the reciprocal shifting of the wall elements is designed to be yielding, elastic and/or flexible to absorb the various changes occurring in the extension of the wall elements by heat difference, especially in the case of flat interspaces. Sealing of the bond to the wall elements can take place by glass welding, soldering, gluing or vulcanizing a gastight also rubberlike material. The seal can be made in several steps and thus offer the advantage of greater security.

A thin metal foil, with which the building and/or light element is trimmed in a V-shape on the edge proves to be an advantageously tight bond of the wall elements.

Alternatively, the edges of a striplike metal foil can be folded tight-fitting on the inside of the wall elements, connected to their edges and to a part projecting beyond the wall elements to a T-shaped cross sectional profile on the outside edge of the building and/or light element.

Melting, soldering or gluing can be used as gastight bond to the wall elements. The getter means can be inserted under the metal foil.

To impart to the hollow space for the getter means a higher resistance to atmospheric outside pressure, an open C profile can be inserted in the hollow space to the edge of the building and/or light element. Thus the hollow space can be made useful for placing of the getter means.

The getter means can also be provided outside of the building and/or light element in a container communicating with an evacuated interspace.

As a further possibility for sealing the interspace the wall elements can be designed on the inside with seal grooves running at least approximately parallel to the edges.

The economical production of the object of the invention is comparatively simple. The transparent or untransparent vacuum-sealed walls, e.g., glass panes, are placed in the desired amount at a distance on top of one another in a lockable vacuum chamber. With one pane after the other, before the insertion, the bracing bodies are laid on, the edge seals and the getter means are applied. After closing of the vacuum chamber, it and thus also the interspace between the panes are evacuated. By simultaneous heating of the panes, water and absorbed gasses are driven out and sucked out of the pane surfaces and seals, so that later they can release only a minimum of gas.

Heating serves the purpose that in the case of soldered edge seals the solder is melted.

If a rubberlike sealing element is used, this can be vulcanized or melted by heating the panes, and the temperature is matched to the respective process. The panes are lowered and pressed by a mechanical holding and lowering device controllable outside the heatable vacuum chamber, so that the bracing elements and the edge seals become effective. Thus, simultaneously the pane edges are vulcanized tight or soldered vacuum-tight together with a flexible metal foil. This is particularly advantageous since the solder or vulcanizing material is degassed at the same time in the vacuum chamber. After cooling, the elements are completely evacuated and sealed and can be taken from the vacuum chamber ready for use. It would be advantageous if the infrared reflecting layer were vapor-deposited in the same vacuum chamber, so that a special vacuum vapor deposition device would be unnecessary. In the way described with the use of the automaton, a particularly economical, energy-saving production of vacuum-insulated elements can be achieved, since all operations are concentrated in one place and follow after and complement one another.

The invention is represented by way of example by means of the embodiments represented in the drawing and subsequently discussed. There are shown in:

FIG. 1, a top view of the building and/or light element according to the invention, FIG. 2, a section through the building and/or light element according to FIG. 1, Fig. 3, a section through a building and/or light element formed from three wall elements, FIG. 4, a section through a curved building and/or light element, FIG. 5, a section through a tubular building and/or light element, FIG. 6, an enlarged section, as a cutout, through a building and/or light element, FIG. 7, an enlarged section, as a cutout, through a building and/or light element, FIG. 8, an enlarged section, as a cutout, through a building and/or light element, FIG. 9, an enlarged section, as a cutout, through a building and/or light element, FIG. 10, an enlarged section, as a cutout, through a building and/or light element, FIG. 11, an enlarged section, as a cutout, through a building and/or light element, FIG. 12 an enlarged section, as a cutout, through a building and/or light element, FIG. 13, an enlarged section, as a cutout, through a building and/or light element, FIG. 14, an enlarged section, as a cutout, through a building and/or light element, FIG. 15, an enlarged section, as a cutout, through a building and/or light element, FIG. 16, an enlarged section, as a cutout, through a building and/or light element, FIG. 17, an enlarged section, as a cutout, through a building and/or light element, FIG. 18, a section through a light element for heating of building outside walls, FIG. 19, an enlarged section, as a cutout, through a building and/or light element, FIG. 20, an enlarged section, as a cutout, through a building and/or light element, FIG. 21, an enlarged section, as a cutout, through a building and/or light element, FIG. 22, an enlarged section, as a cutout, through a building and/or light element, FIG. 23, a section through a thin-film vacuum collector, FIG. 24, a section through a thin-film vacuum collector, FIG. 25, a section through a thin-film vacuum collector, FIG. 26, an absorber element, FIG. 27, a section through a heat accumulator, FIG. 28, a heat accumulator, FIG. 29, a punch device, FIG. 30, a way of arrangement of the punch device, FIG. 31, an enlarged section, as a cutout, through a building and/or light element, FIG. 32, an enlarged section, as a cutout, through a building and/or light element, FIG. 33, an enlarged section, as a cutout, through a building and/or light element made of three wall elements, and FIG. 34, a top view of an edge seal on the corner of a building and/or light element.

FIG. 1 shows a building and/or light element with the arrangement of support elements 2 between wall elements 1.

In FIG. 2 this building and/or light element is represented with interspace 3 in section.

Figure 1:
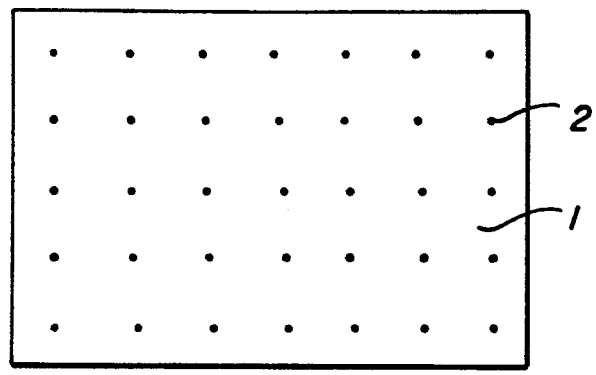
Figure 2:
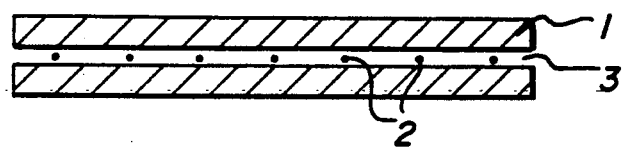
Figure 3:
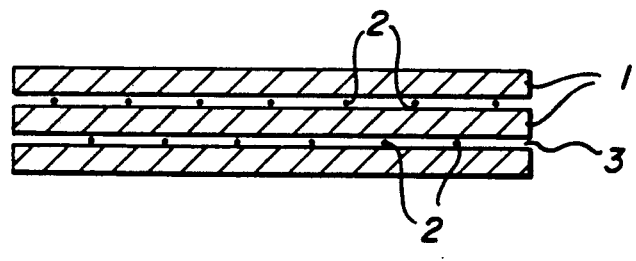
FIG. 3 illustrates a building and/or light element made from three wall elements 1.
Figure 4:
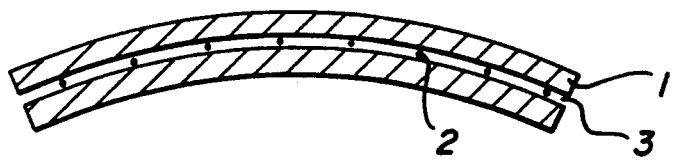
FIG. 4 shows a curved building and/or light element according to the type of embodiment of FIGS. 1 to 3.
Figure 5:
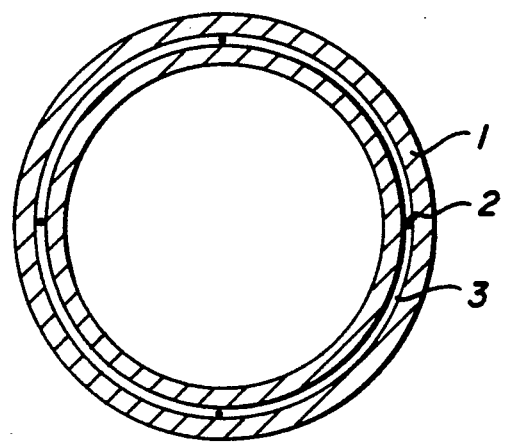
FIG. 5 is a building and/or light element from two concentrically arranged tubular wall elements 1 separated by an annular slot.
Figure 6:
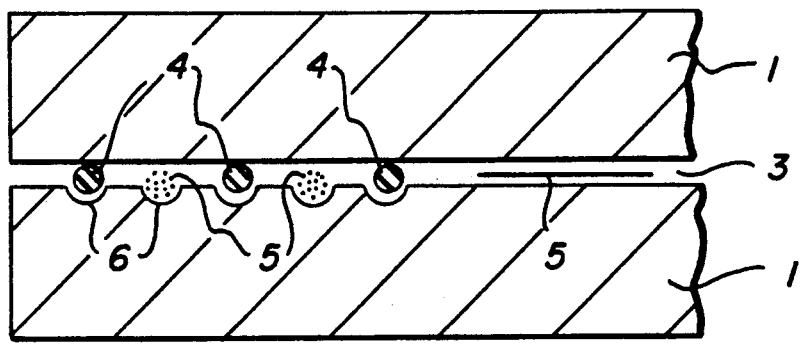

FIG. 6 shows a two-stage edge seal of an elastic, rubberlike material. Between seals 4 lying in grooves 6 there are provided in lower wall element 1 getters 5 which could also be present in upper wall element 1. The ducts lying between seals 4 are evacuated and mutually sealed so that the failure of a seal 4 has no perceptible effect on the next stage.

Figure 7:
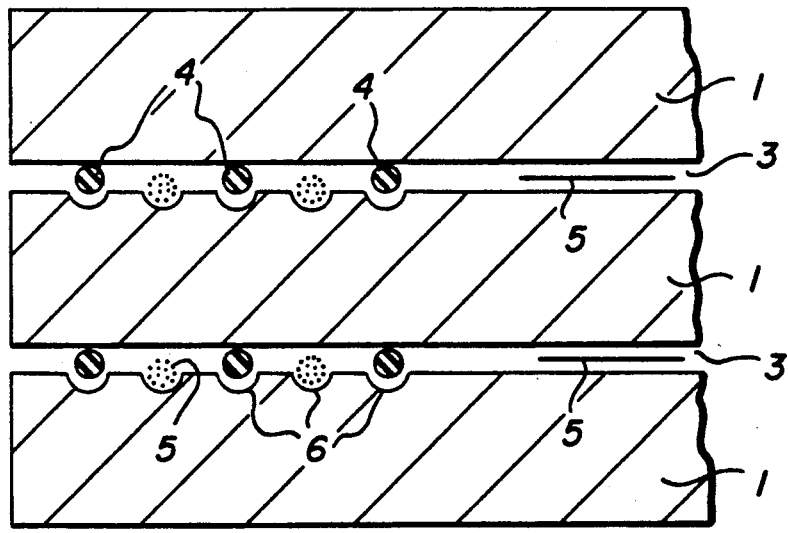

FIG. 7 analogously shows a seal arrangement according to FIG. 6.

Figure 8:
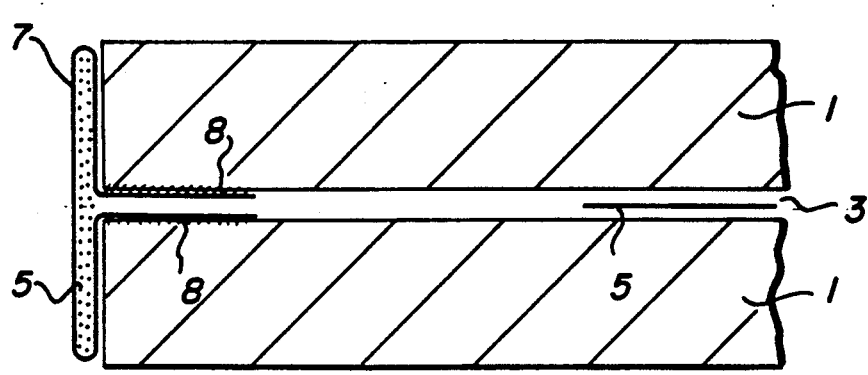

In FIG. 8 a flexible edge seal of a thin metal foil 7 is represented, which is soldered or glued by its edges to the inside of wall elements 1 and its remaining part fits folded projecting over the edges of the building and/or light element. Getter means, which are heated by light radiation, can be placed in the form of a thin lining or strip in the evacuated interspace 3.

Figure 9:
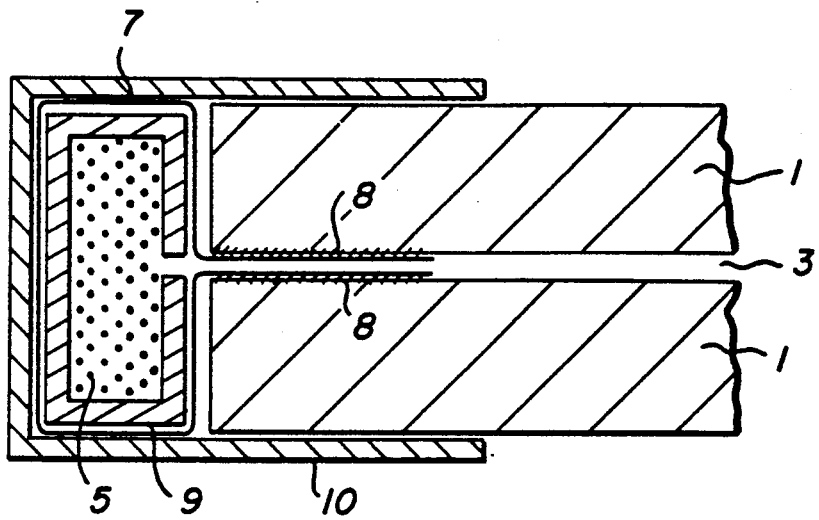

FIG. 9 illustrates a flexible edge seal as in FIG. 8, with the difference of large space provided for receiving the getter means. This is achieved by insertion of a compression-resistant C shape 9, which is surrounded by a T-shaped metal foil. U-shape 10 acts as a mechanical protection.

Figure 10:
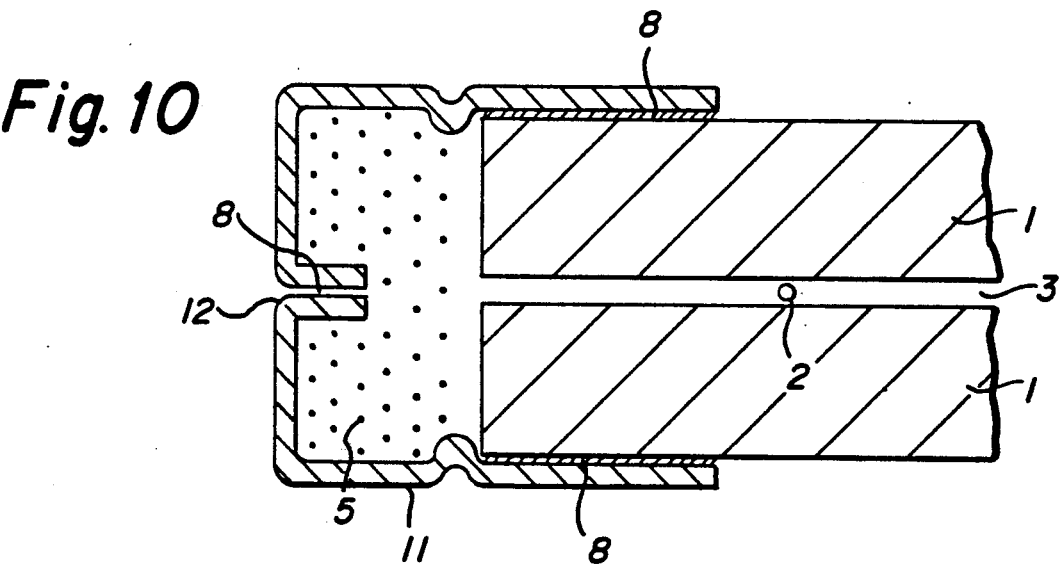

FIG. 10 represents a flexible edge seal of a two-part metal shape 11. The legs are glued or soldered to wall elements 1, just as separation point 12 of the two-part metal shape. This application is also possible for the embodiment according to FIGS. 6 to 8.

Figure 11:
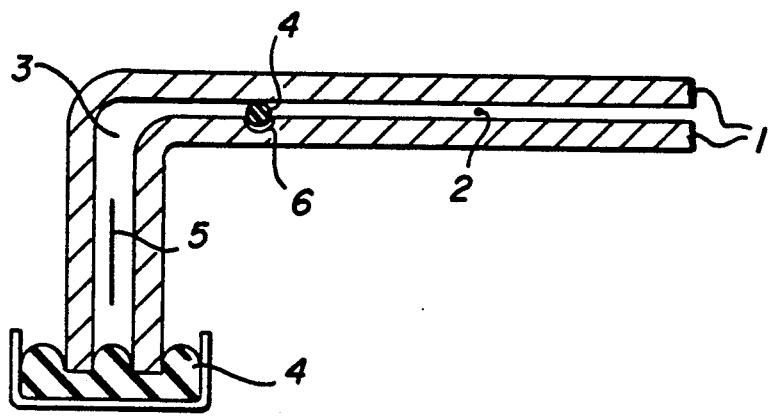

In FIG. 11 is shown an edge seal, in which wall elements 1 are made bent and their free ends immersed in a sealing compound. By application of further vacuum stages as in FIG. 6, the assurance for maintaining the permanent vacuum in interspace 3 is increased.

Figure 12:
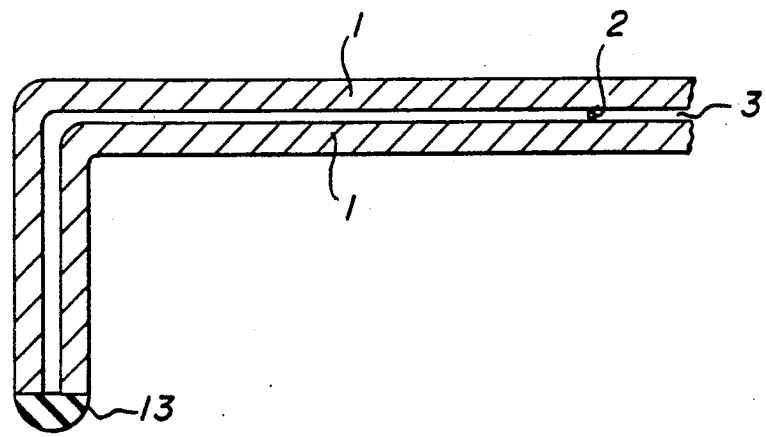

FIG. 12 shows a similar edge seal, in which the bent ends of wall elements 1 are reciprocally fused at 13.

Figure 13:
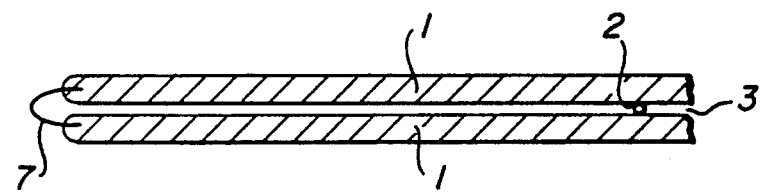

FIG. 13 shows a U-shaped metal foil 7a with its free ends fused to wall elements 1.

Figure 14:
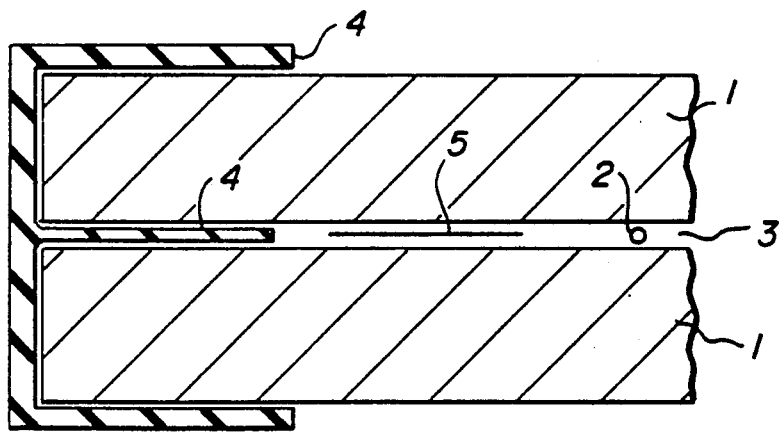

FIG. 14 illustrates an edge seal of a vulcanized material surrounding wall elements 1.

Figure 15:
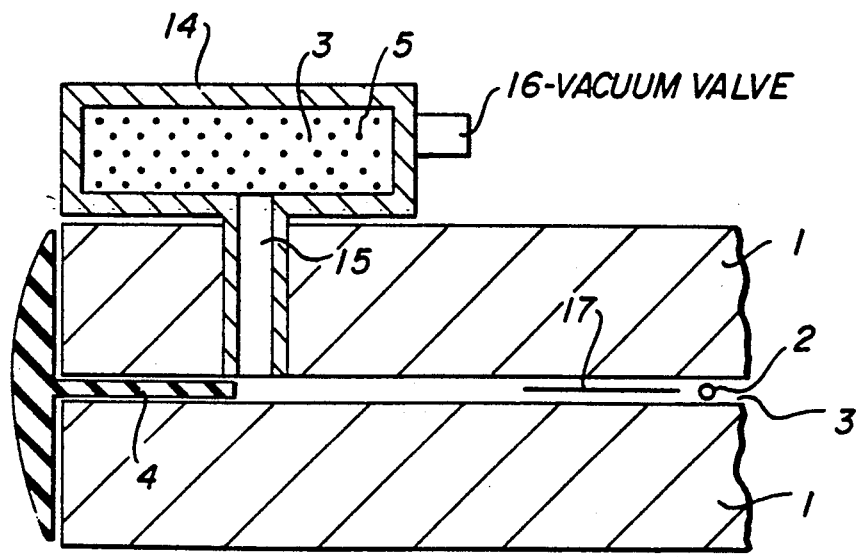

In FIG. 15 is represented an edge seal according to FIG. 6 or 14 with a vacuum-sealed square tube frame 14, which communicates with interspace 3 by means of a connection. The hollow space of the tube is provided with getter means. A vacuum valve 16 can be fastened to this tube frame. To cancel the infrared radiation the surfaces of wall elements 1 turned toward interspace 3 can be provided with a silver, gold or other vapor-deposited layer serving the same purpose.

Further, it is possible to mount the getter means in a replaceable manner without the vacuum suffering during the replacement.

Further, the vacuum-insulated building and/or light elements can be made with a valve or the like, which allows reevacuation after a very long time, but which is hardly necessary, since the getter means constantly absorb possible gas releases of wall elements 1 and of the seals.

This problem occurs chiefly in the high-vacuum range but is largely eased in this present case.

Figure 16:
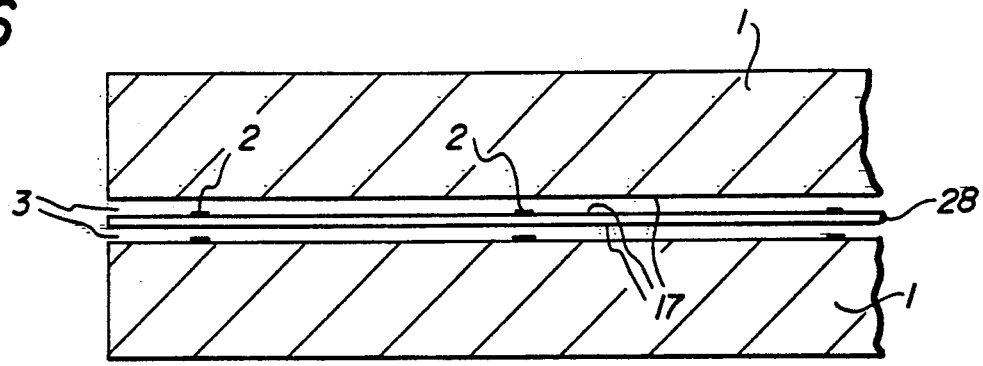

FIG. 16 shows a building and/or light element in whose evacuated interspace 3 are placed thin glass panes or foils 28 with an infrared reflecting coating 17 on the walls. The advantage of this arrangement is in the minimal thickness attainable with overall coefficient of heat transfer under 0.3 $W/m^2 K$ in light elements. If transparency is not necessary, e.g., for thin-walled heating plates, an overall coefficient of heat transfer far under 0.3 $W/m^2 K$ can be attained.

The reason for this is that the nontransparent layers, are significantly more efficient.

Figure 17:
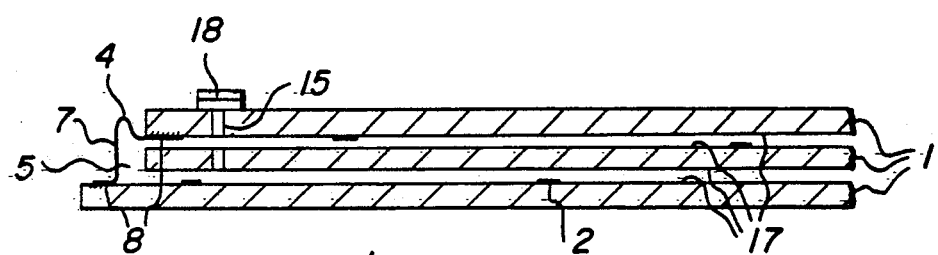

FIG. 17 represents a light element with evacuated interspaces formed from three wall elements 1, two of wall elements 1 being set back in relation to the other wall element 1 with its edge. Because of the different temperatures on both sides of the light element a flexible edge seal is provided because of the uneven surface expansion. If the material used for the edge seal has a different expansion coefficient than that of the wall elements, a contraction or compensation of the edge seal directed perpendicular to the expansion is to be considered. A contracted or corrugated fine steel foil proves very useful for this purpose.

Figure 18:
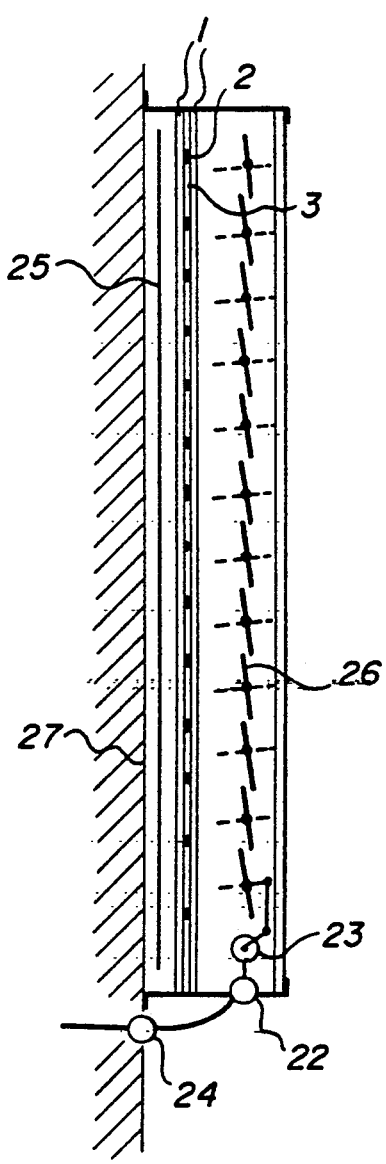

FIG. 18 illustrates the use of a shading device 26 on the outside wall of a building. A shading device prevents too great heating of wall 27. Driving of shading device 26 takes place by a bimetallic element or by an electric motor 23, which is supplied by a solar cell 22 and is controlled by a thermostat 24.

Figure 19:
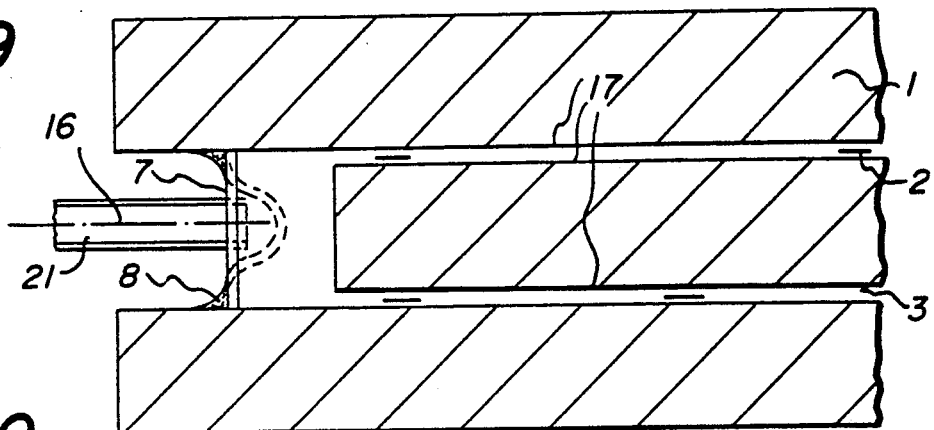

FIG. 19 shows a building and/or light element with a central wall element 1 moved back inward from the edge of the other or outer wall elements 1. In the hollow space thus resulting a foil seal 7 soldered to the outside wall elements is provided, together with an evacuation tube 21, which can be closed by means of valve 16 or by squeezing.

Figure 20:

FIG. 20 represents a building and/or light element with four wall elements 1, of which the two center ones are set back from the edge so that a protected space for placing of soldered metal foil 7 results. A long path for the heat conduction results by the offset arrangement of support elements 2.

Figure 21:
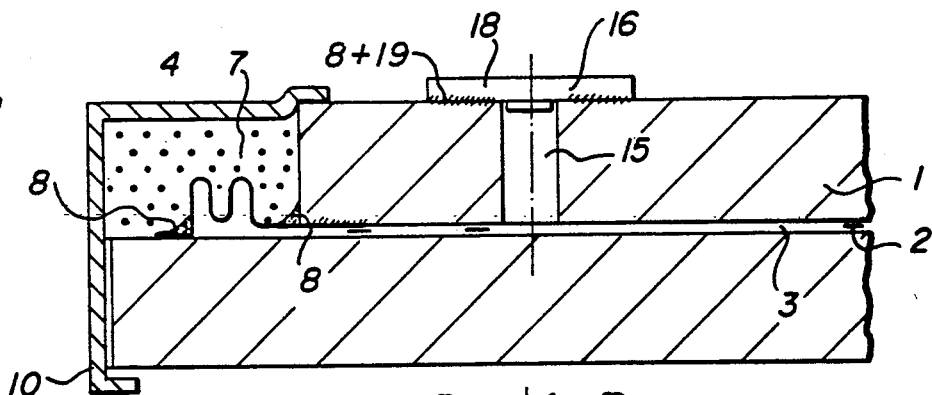

FIG. 21 illustrates a building and/or light element a wall element 1 set back from the edge. Folded metal foil seal 7 is additionally protected by an edge protective shape 10, which can be packed with foam material. By sealing of the edge shape the hollow space can serve as a prevacuum chamber. It can be evacuated by the opening and subsequently cover 18 can be closed by means of melting solder 19.

Figure 22:
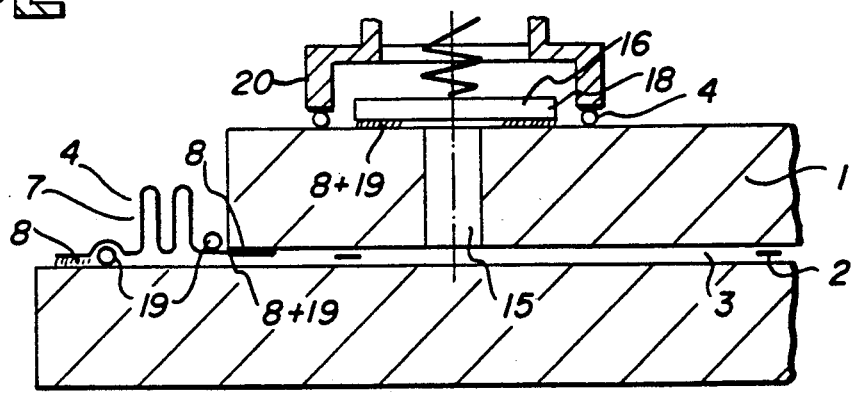

FIG. 22 shows a building and/or light element according to FIG. 21, but with removable tube 20, by which it can be evacuated. The two solder wires 19 running parallel to the folded metal foil, contracted crosswise, produce a tight soldering bond between glass and metal foil 7 during melting.

Figure 23:
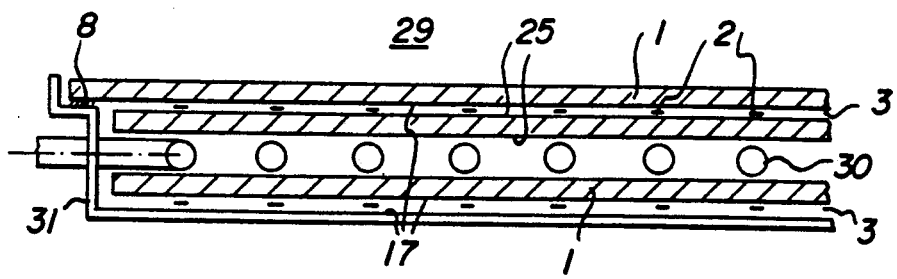

FIG. 23 shows a thin-layer vacuum collector 29 in a metal housing. The coil or duct compressed between two wall elements 1 by atmospheric pressure serves for removal of obtained light heat and solar heat.

Figure 24:
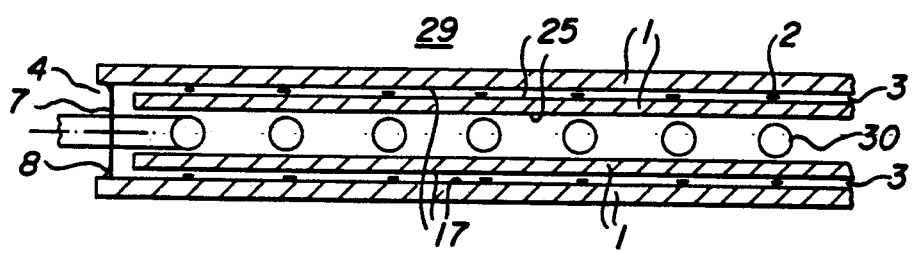

FIG. 24 represents a collector similar to FIG. 23 but with four wall elements 1 and a soldered metal foil seal 7. Wall element 1 is transparent on the light irradiation side. Inside wall element 1, which presses on the coil, is selectively coated. Transparent wall element 1 on the irradiation side as well as the rear wall elements can be coated on the vacuum side to reflect infrared.

Figure 25:
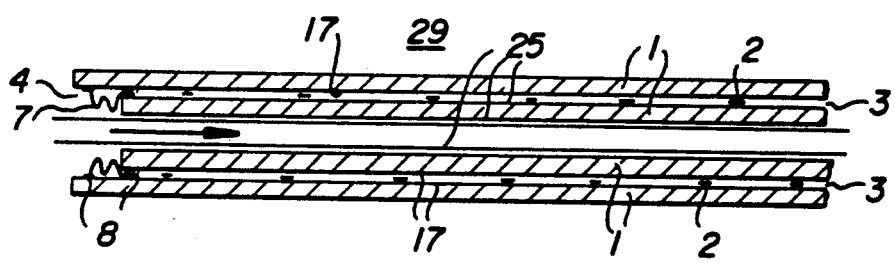

FIG. 25 shows a thin-film vacuum collector, consisting of an absorber 30, not placed in the vacuum space, but protected in a heat insulating way on both sides by a vacuum-insulated building and/or light element each.

Figure 26:
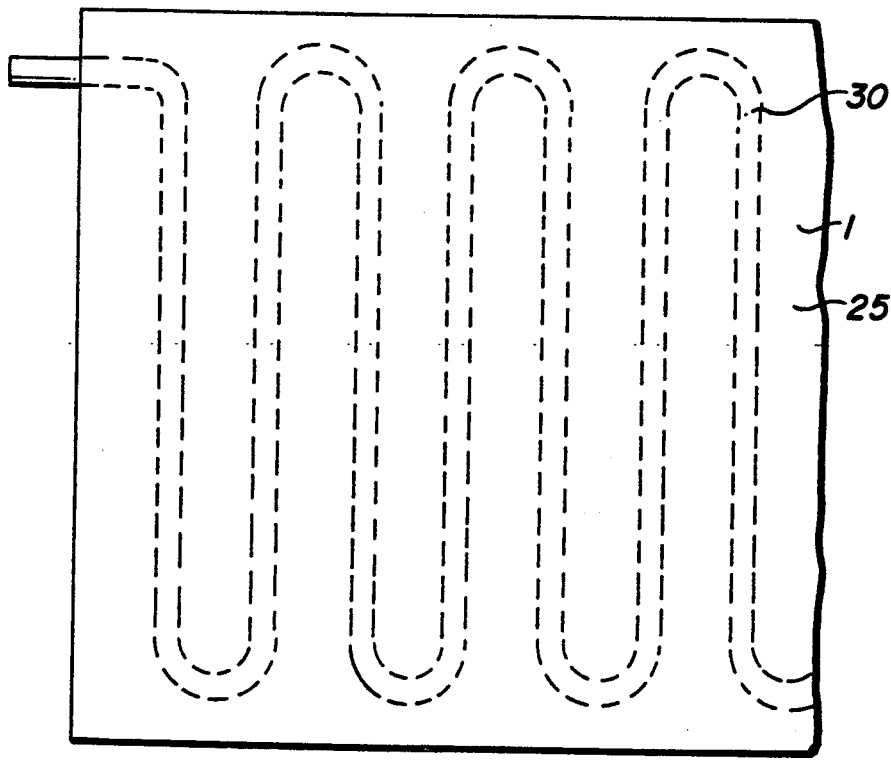

FIG. 26 represents an absorber element with coil 30 and selective coating.

Figure 27:
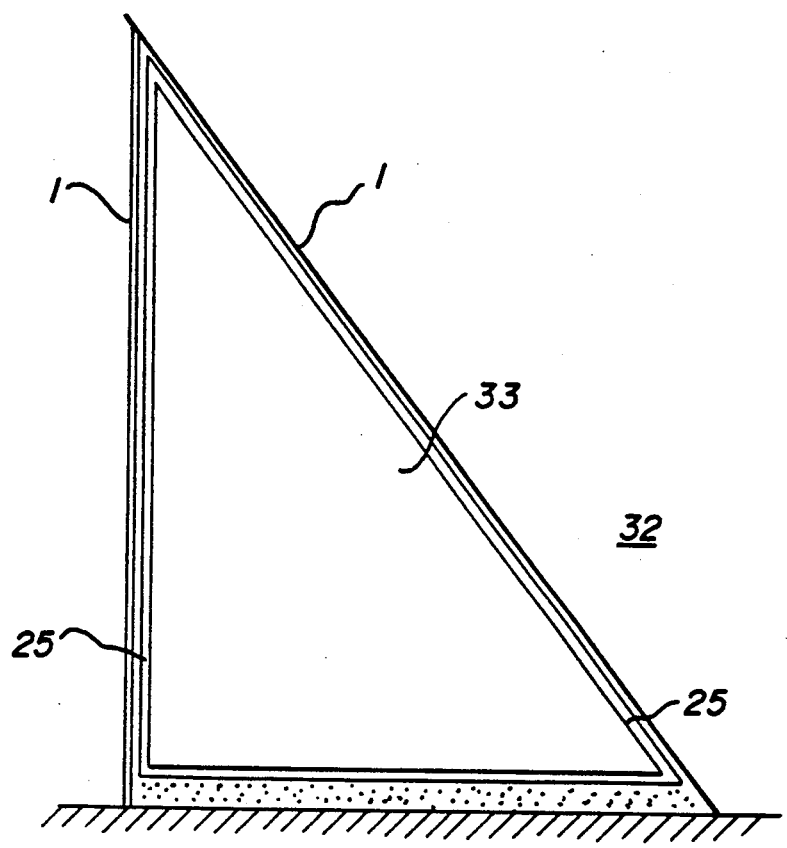

FIG. 27 shows a season heat accumulator 32. The selective film on container outside wall 33 serves for receiving the light irradiation. The entire container is lined on the outside with vacuum-insulating building and/or light elements. In the winter the snow can slide down an the sloped side.

Figure 28:
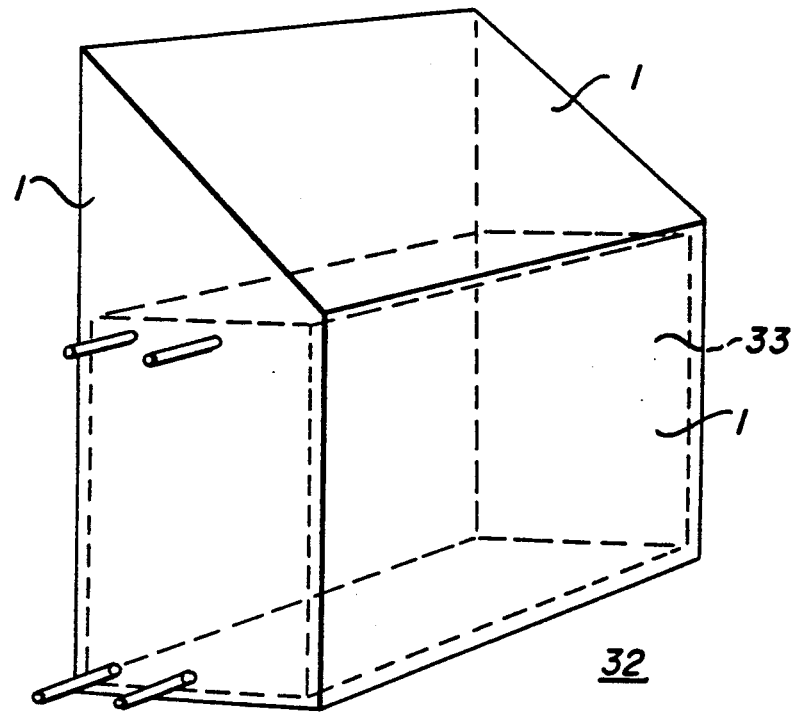

FIG. 28 shows a season heat accumulator 32 similar to FIG. 27, but with a cubical accumulator container 33.

Figure 31:
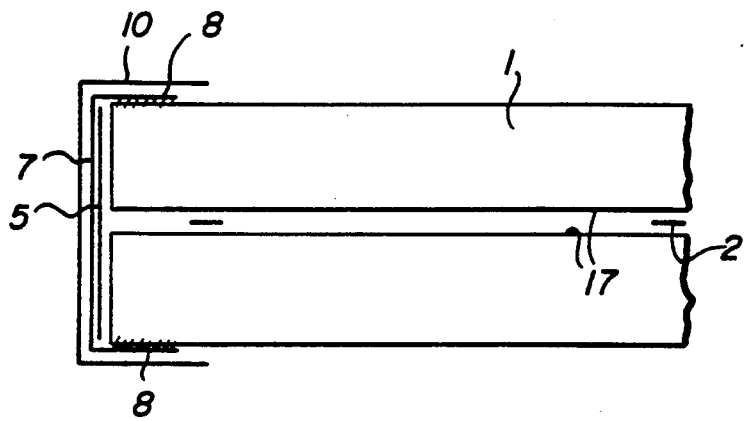

In FIG. 31 another alternative building and/or light element made from two wall elements 1 is represented, which are surrounded in a U-shape manner by a metal foil 7 made as an edge seal and soldered to the outside surfaces of wall elements 1. A getter strip 5 is provided under metal foil 7, and a protective coating 10 covers the entire seal.

Figure 32:
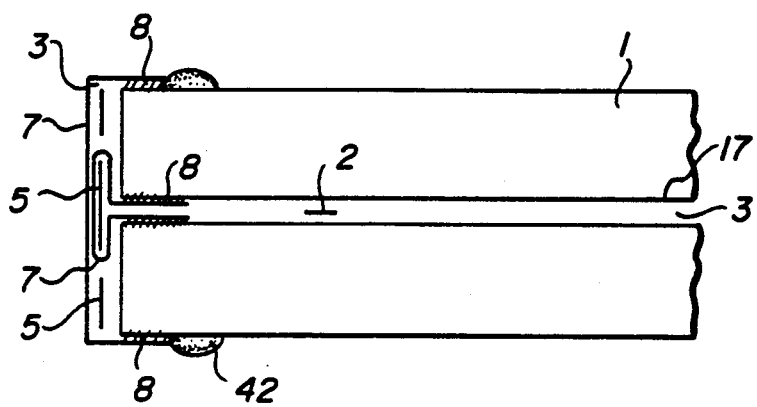

FIG. 32 shows a building and/or light element as represented in FIG. 31, with the difference of the use of a two-stage metal foil seal 7. Getters 5 are provided within the reciprocally sealed vacuum stages.

A conspicuous residual leak rate through the boundary layer of copper and glass in the pre-vacuum stage can be largely avoided by a seal 42.

Figure 33:
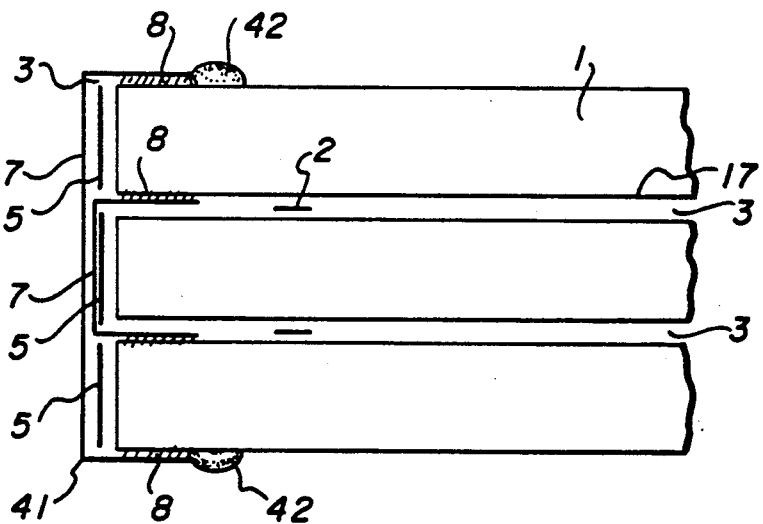

FIG. 33 shows a building and/or light element as in FIG. 32, but with three wall elements 1.

Figure 34:
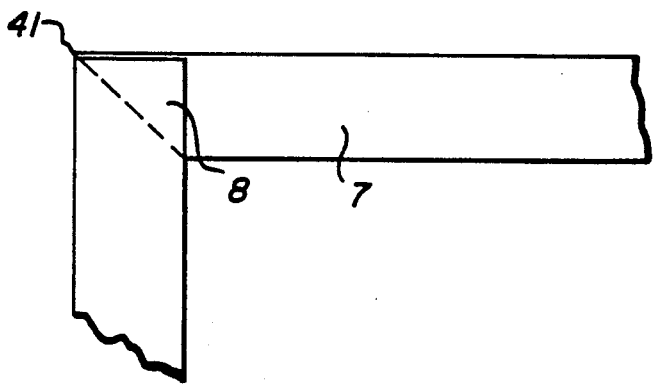

A metal foil seal 7, folded in the corners and whose fold is soldered, is shown in FIG. 34.

In the manufacturing of the building and/or light element according to the invention, the production and insertion of bracing elements 2 takes on great significance. The present invention concept suggests that bracing elements 2 be placed over their final position on the one wall element 1 through a punching device 38 and be applied by being punched out of a foil-like material.

Thus tests have shown, among other things, that microthin, transparent disks between wall elements 1 in a thickness of about 1 mm in diameter can hardly be seen.

Figure 29:
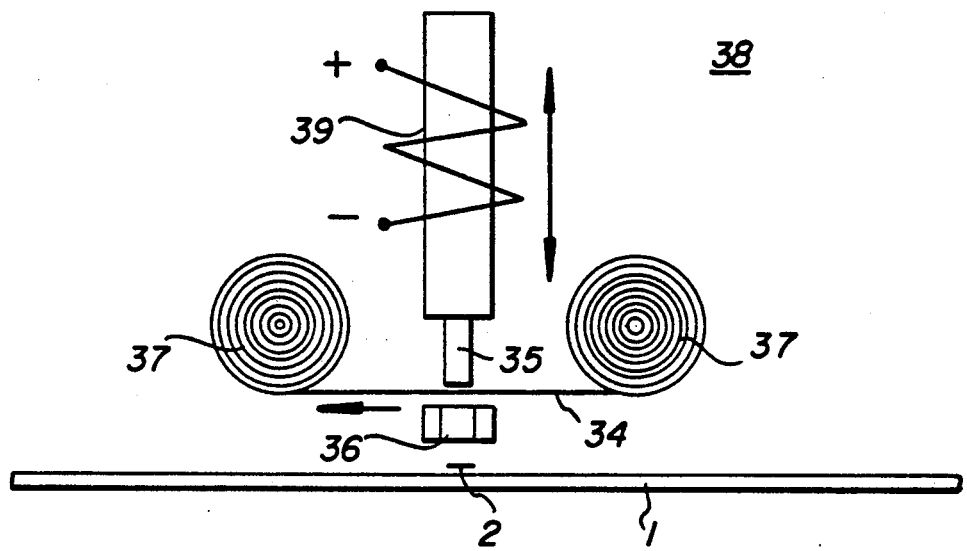

A simple, very economical process consists in punching small disks from a foil 34 perpendicular over the final position on a horizontal glass surface where bracing elements 2 must be placed. For this purpose a foil strip 34 is advantageously advanced and punched in synchronized fashion between a mechanically or electromagnetically operated punch 35 and a matrix 36, so that the punched piece falls perpendicular in the correct position or is pressed there by punch 35. Punching device 38 advantageously has an unrolling and a rolling up device 37 for foil strip 34, similar to the typewriter ribbon on a typewriter (see FIG. 29).

Figure 30:
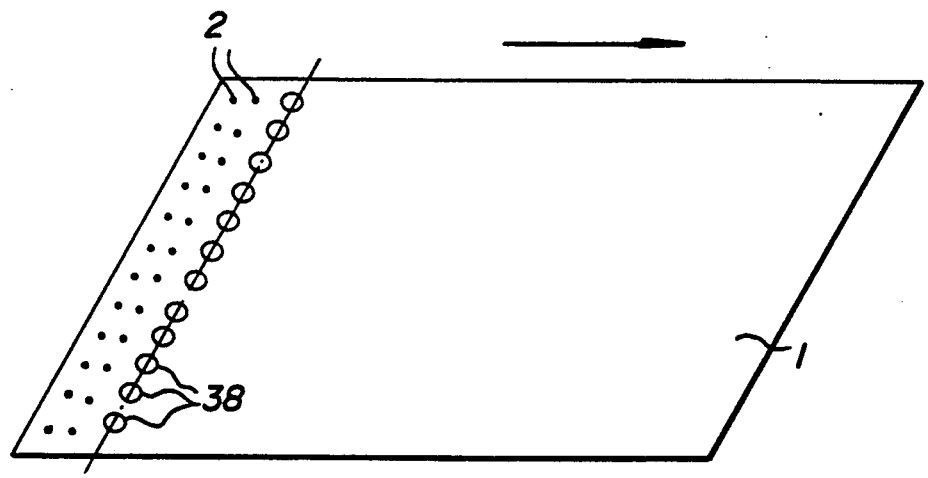

Since bracing elements 2 are placed gridlike at regular distances on a glass pane, one or more of the described punching devices 38 is moved over the glass surface in the correct position, or the glass pane under the stationary punching device or devices 38 can be moved (FIG. 30).

An especially rapid application of bracing elements 2 is achieved in that the same number of punching devices 38 are arranged above wall element 1 with the same modular dimension as there are bracing elements 2 to be placed on the glass.

Thus, with large window surfaces, several thousand bracing elements 2 can be punched and precisely positioned above a glass surface per second.

For bracing elements 2, which are placed in any way gridlike on a glass surface, there exists the possibility of providing electrostatically chargeable needles or metal pins under the glass pane to position bracing elements 2 correctly.

Panes applied as bracing elements 2 have the advantage, as compared to spheres or bolts, that they cannot roll away or overturn after being applied.

A further rational application of optically nondisruptive bracing elements 2 makes the vacuum deposition technique possible in that the bracing elements are deposited through masks, as is usual in microchip production.

The substrate to be deposited upon must exhibit high resistance to pressure and a small heat conduction ability.

To the extent that bracing elements 2 exhibit a diameter of less than 0.3 mm, they do not need to be transparent, since when that small they are no longer visible in a window. The form of the deposited bracing elements is oriented toward economical production methods.

Furthermore, there exists the possibility of applying small, invisible bracing elements 2 to a glass surface through a pressure process. The paste-like or meltable bracing element material is placed on the glass surface like dots in predetermined grid arrangement o in another suitable way, so that after the paste hardens compression-proof bracing elements 2 appear in the form of small bumps on the glass surface.

Bracing elements 2 were also able to be scattered on a boundary surface and the scattering can occur in various ways. With a thin plate exhibiting gridlike perforation, bracing elements 2 can be positioned.

The application of bracing elements 2 can also occur with a perforated cylinder whose holes correspond to the grid distance of the bracing elements on wall element 1 and bracing elements 2 fall out of or are pressed out of the holes of the cylinder when the cylinder is unrolled on the boundary surface.

It is advantageous if the bracing element material for all types of bracing elements or the bracing element bearing surface is less hard than glass so that the boundary surface is not damaged through the pressure caused by the vacuum.

The vacuum required for the interspace lies in the undemanding fine vacuum range. High vacuum is not necessary.

The distance of bracing elements 2 to each other depends on the section and the resistance to pressure of the material used. Through optimization, as little heat conduction as possible must be sought. Bracing elements with getter effect would be ideal.

The smaller the sections and thus the tolerance to compressive force, the smaller the distances between bracing elements 2 are to be chosen, through which an optimization of the thickness of the wall elements or a solution which favorably affects the price of the wall elements is made possible.

With the use of thin sheet glass for a vacuum insulated building and/or light element a laminated glass arises which is significantly more resistant to bending under wind pressure than conventional insulating glass with two or three glass panes.

A certain glass laminate arises due to the fact that with a vacuum insulated light element two, three or more glass sheets with an atmospheric pressure of 10 tons per $m^2$ press on bracing elements 2 arranged in microthin vacuum layer 3 and bracing elements 2 offer resistance to a lateral shift of the glass sheets. Two, three or more glass sheets achieve approximately the strength of a single glass in the overall thickness of the sum of the single glasses.

In vacuum insulated light elements according to prior art, this laminate effect does not occur with bolt-like or spherical bracing elements because the latter cannot offer resistance to a lateral shift of the glass sheets when bending.

Together with the most different types of applications of high insulating glazings and combinations, the vacuum insulated light element is also suited for the lining and active insulation of building facades as a light-heating element.

So that direct solar radiation cannot too greatly heat up building walls 27 behind the light elements, the latter are combined with a shading device 26 which can be automatically adjusted with a thermostat 24. The shading device is advantageously provided in the hollow space between the vacuum insulated light element and a parallel, transparent or partially transparent facade panel 40, which can be structured like plaster. To receive the light energy a selective layer 25 can be used.

The vacuum insulated light element with microthin interspace 3 also allows a highly efficient active use of solar energy, through solar collector 29, in that between two glass panes a selective layer 25 turned toward the sun is arranged on an absorber 30.

The heat produced in absorber 30 through solar or light radiation can be fed to an accumulator 32 or to a heat consumer.

Between absorber 30 and the front and rear glass coating there is a microthin vacuum layer 3, with the advantage that in a possible implosion no dangerous glass slivers can be scattered and no high vacuum is necessary, only a fine vacuum. This type of thin film vacuum collector 29 can also be used as a facade element with or without shading device 26.

The atmospheric outside pressure of 10 tons per $m^2$, which exerts pressure on the glass coating and, through bracing elements 2, on absorber 30, can be used to squeeze together a coil 30 located between two absorber panels.

The high pressing power provides a good heat conducting bond between absorber panel 30 and coil, so that a weld or solder joint can be dispensed with.

A vacuum insulated light element with overall coefficients of heat of about 0.3 $W/m^2 K$ first of all makes possible the construction of a zero-loss season heat accumulator 32. For this a container 33, provided on the exterior with vacuum insulated light elements, is set up outside. Since the light and solar radiation hitting container sides 27 is stronger than the escaping heat loss, the accumulator medium in accumulator 32 cannot cool off, i.e., no losses due to stagnation occur. Because of this, warmth at a high temperature level can economically be stored from summer into winter. Simple steel, plastic, or concrete containers serve as container 33 for water. The outer walls of the container are advantageously provided with a selective layer 25 for absorbing the solar energy. This type of accumulator can also be placed directly under the roof of a house if the roofing material near the accumulator is transparent or made of vacuum insulated elements.

Vacuum insulated building and/or light elements according to the invention concept are also suited as economical thin film insulations for refrigerators, top-opening freezers, cold storage rooms, etc., and everywhere where high thermal insulation is to be achieved with the smallest required space. Instead of glass sheets, metal plates in any number of layers can also be used so that overall coefficients of heat transfer less than 0.1 $W/m^2 K$ at a thickness of about 10 mm can be achieved. An even better overall coefficient of heat transfer is achieved by placing infrared reflecting foils in microthin vacuum layer 3.

It is advantageous to solder the edge seals to the glass surfaces in a vacuum furnace built for the purpose. For this purpose the glass edges and edge seals are tin-plated in advance. After bracing elements 2 are put on and the edge seal placed on the first glass pane, the second glass pane is placed on it. Each pane is separated from the other by a holding device or solder. After the closing of the vacuum furnace doors evacuation and heating of the vacuum furnace can begin.

Simultaneously the air and humidity between the glass panes are also drawn out. After a certain time the oven temperature is raised so that edge seals 7 and solder 19 melt. This causes the upper pane to sink under its own weight onto edge seal 7 with liquid solder 19 so that a gastight bond is made. After stopping the heating process solder 19 cools so that a completely evacuated light element can be taken from the furnace. If the weight of the upper pane itself is not a sufficient load, additional pressure can be used to assist. Instead of bracing solder 19, whose melting allows the upper pane to sink onto the edge seal and bracing elements 2, a mechanical lowering device can also be used.

The evacuation of a light element can also take place using a tube 21 inserted through the edge seal and later sealed off and soldered shut.

An opening 15 going through the glass panes or the edge seal can also be evacuated. For this purpose a tube 20 is pressed tightly onto the glass panes or the edge seal and the air is drawn off through this tube 20. Within tube 20 above opening 15 there is a cover 18. During evacuation the latter is raised somewhat; therefore, not tightly placed on. After evacuation is finished cover 18 is lowered and closed so it is gastight. This occurs through liquefied solder 19 between the glass panes and edge seal which is heated by a heat source. In this way evacuation can be done right in the vacuum furnace, even when the edge seals are already attached tightly.

After the required vacuum is reached, solder 19, located between cover 18 and edge seal 7 or the glass surface, is melted by a heat source so that a gastight solder joint 8 develops.

Great demands are made on the air-tightness of the edge seals of insulating glass panes in which there is a hollow space with dry air or an insulating glass between two glass panes.

The metal strips used are fused tightly with the glass or a copper layer by melted solder. So the melted solder can form a bond with the glass, the glass surface on the edge of the glass pane is coated with a thin layer of copper. The application of the thin copper layer is achieved by so-called flame-spraying. A copper wire is led through the flame of an oxyacetylene torch and is melted off.

The melted copper particles are sprayed through the hot flame onto the glass surface and fuse there with the glass surface. The big problem of flame spraying consists in the oxidation of the liquid copper in the gas flame, which is fed with oxygen and acetylene gas. The smallest oxygen overflow into the gas flame causes oxidation of the liquid copper, which makes a tight bond with the glass surface questionable.

However, especially for vacuum insulated window glass very great demands are placed on the air-tightness of the edge bond.

Poorly adhering copper layers lead to leaky glass seals and thus to expensive guarantee work. To avoid these circumstances it is suggested that a metal spray process be used which prevents the disadvantages of the known process.

The plasma application process can meet the demands set.

Oxidation of the liquefied metal is completely excluded because the molten metal process takes place surrounded by noble gas. This results in good reproducible, homogeneous and nonoxidizing metal layers on glass panes.

With the plasma process the noble gas, for example argon, is fed into a torch, through which an electric arc flows. The noble gas is ionized and an electron splits off, producing a large burst of energy. A second burst of energy arises when the split off electron falls back again. The welding material, for example copper, is added in doses in powder form to the ionized gas, which reaches temperatures of about 20,000° C. The liquid copper particles are flung with great speed onto the glass surface and fuse with the glass within a protective covering of noble gas, with oxygen being excluded.

So that the glass surface is free of water and oxygen, it is preferably cleaned, before being sprayed with the metal layer, with a hot jet of protective gas or a flame, and the flame can also be produced with a plasma torch.

The glass surface coated with the metallic material, copper for example, aims to bond the glass tightly with solder to a metallic edge seal of a vacuum insulated glass window. Immediately after the copper application the solder layer is likewise applied with the plasma method.

It proves advantageous if the applied layers are sealed at the junction with the glass to be able to prevent a residual leak rate.

We claim:

1. A process for the production of a heat-insulating building and/or light element comprising the steps of positioning a plurality of flat support elements (2) between at least two substantially parallel wall elements (1) to space the wall elements a predetermined distance apart, applying a metallic foil seal to the edge areas of the spaced wall elements to form a tight bond therebetween so as to define an evacuable interspace (3) therebetween and to absorb any differences in expansion of the wall elements resulting from differences in the temperatures of the wall elements, evacuating the interspace to a vacuum between 1 and $10^{-2}$ mbar, the distance between the wall elements being smaller than the free path lengths of air molecules as determined for that vacuum such that the heat conductivity of the air molecules between the wall elements is substantially cancelled.

2. Process according to claim 1 wherein support elements (2), over their final position on the one wall element (1), are punched by punching device (38) out of a stepwise fed foil or platelike material and applied.

3. Process according to claim 1, wherein a punching device (38) with several stations matched to the modular dimension of support elements (2) and a feed device for the material to be punched are provided.

4. Process according to claim 3, wherein under the wall element (1) supporting support elements (2) and punching device (38) are provided electrostatically chargeable needles or pins for positioning support elements (2).

5. Process according to claim 1 wherein support elements (2) are vapor deposited on the provided wall element (1) according to a mask perforated with a grid of the final position of support elements (2).

6. Process according to claim 1 wherein support elements (2) are applied as a hardening paste or a melting material.

7. Process according to claim 1 wherein support elements (2) are arranged by scattering on wall elements (1).

8. Process according to claim 1 wherein support elements (2) are applied on a wall element (1) from a rolling cylinder provided with openings on the surface perimeter according to the predetermined modular dimension.

9. Process according to claim 1 wherein the evacuation of interspace (3) occurs through an opening in the edge seal, wall elements (1) or getter means holder and this opening is soldered in a vacuum and the soldering joint is first brought into contact with the atmospheric environment after the solder hardens.

* * * * *